United States Patent [19]

Yoshigai

[11] Patent Number: 5,058,450
[45] Date of Patent: Oct. 22, 1991

[54] DEVICE FOR ADJUSTING A RETURN SPRING IN A BICYCLE BRAKE ASSEMBLY

[75] Inventor: Kenichi Yoshigai, Osaka, Japan
[73] Assignee: Yoshigai Kikai Kinzoku Co., Ltd., Osaka, Japan
[21] Appl. No.: 512,161
[22] Filed: Apr. 20, 1990
[51] Int. Cl.⁵ ............................................. F16C 1/10
[52] U.S. Cl. ............................ 74/502.2; 188/24.12; 188/24.21; 188/72.3; 267/177
[58] Field of Search ............... 74/501.5, 502.2, 519, 74/527; 188/24.12, 24.21, 24.22, 72.3, 196 F; 267/175, 177

[56] References Cited

U.S. PATENT DOCUMENTS

| | | | |
|---|---|---|---|
| 2,160,181 | 5/1939 | Taylor | 188/24.21 |
| 4,301,894 | 11/1981 | Arai | 188/24.19 |
| 4,793,444 | 12/1988 | Nagano | 188/24.12 |
| 4,798,100 | 6/1989 | Baumgarten | 74/502.4 |
| 4,833,937 | 5/1989 | Nagano | 74/502.6 |
| 4,838,387 | 6/1989 | Yoshigai | 188/24.12 |

FOREIGN PATENT DOCUMENTS 3720115 12/1987 Fed. Rep. of Germany ... 188/24.21

Primary Examiner—Rodney M. Lindsey
Assistant Examiner—F. Saether
Attorney, Agent, or Firm—Sixbey, Friedman, Leedom & Ferguson

[57] ABSTRACT

A pair of arms provided with brake shoes is mounted onto a cycle body via a mounting plate, so as to be freely rotatable, and an adjustment metal is installed between a shaft on the mounting plate and a bossed section of one arm, one edge of said adjustment metal being engaged onto the bossed section and the other edge being indirectly connected to the aforementioned shaft. The return spring tension can be strengthened or weakened by rotation of this adjustment metal from outside. The clamping protrusions on the adjustment metal are made to engage onto the ratchets on the stop ring by strong pressure from a spring element.

3 Claims, 2 Drawing Sheets

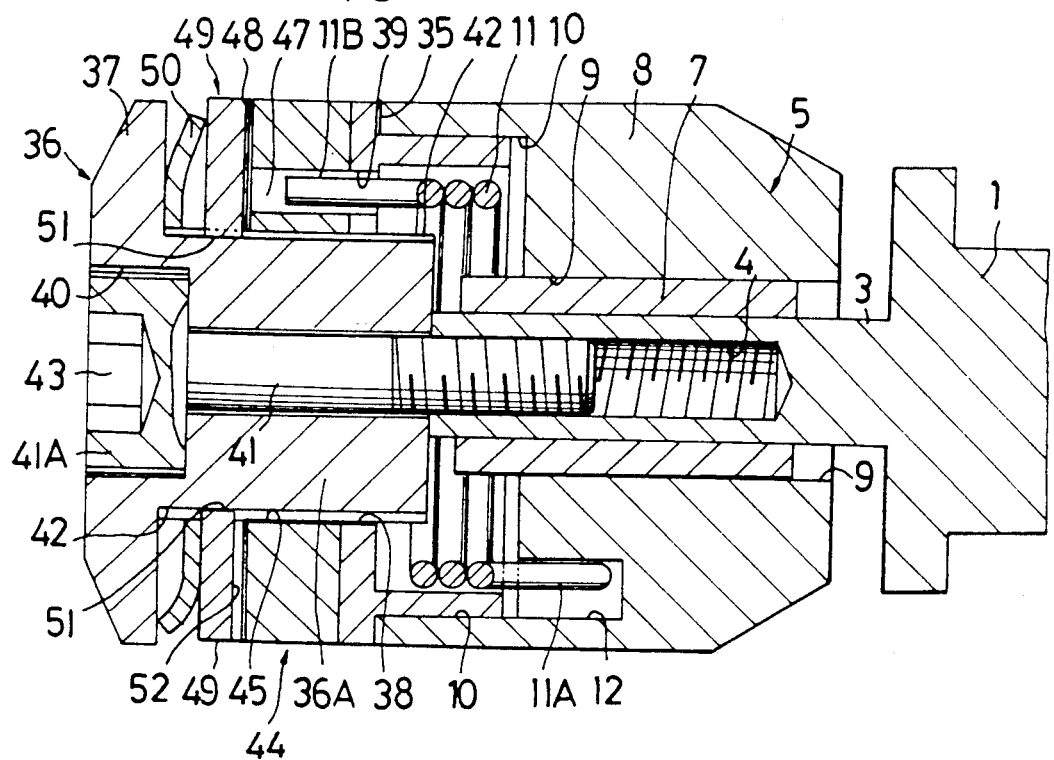
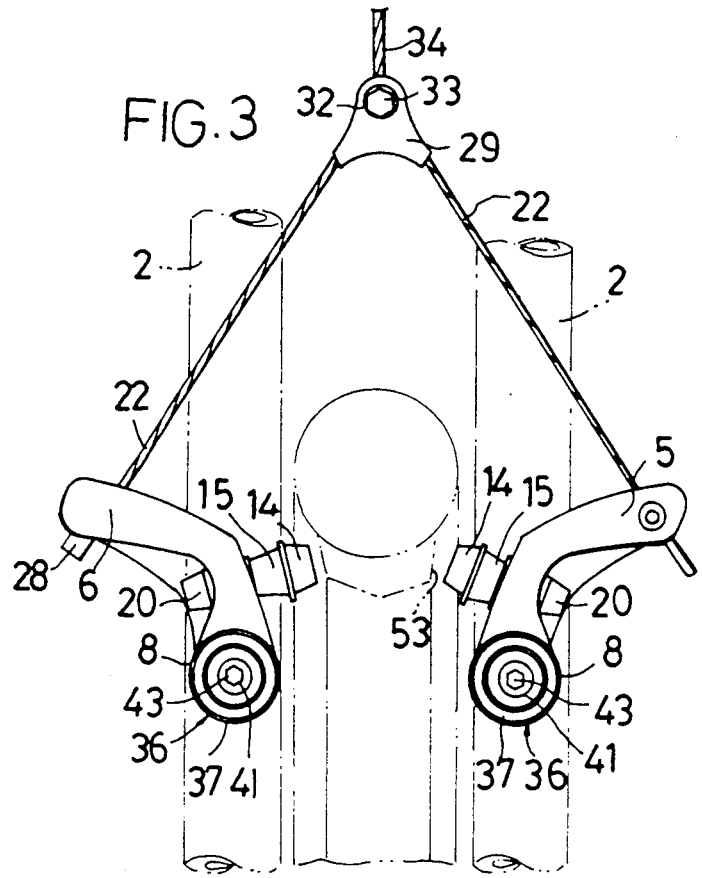

DEVICE FOR ADJUSTING A RETURN SPRING IN A BICYCLE BRAKE ASSEMBLY

FIELD OF THE INVENTION AND RELATED ART STATEMENT

The present invention relates to a brake such as a caliper brake and a cantilever brake for a cycle.

A known example of the conventional center-pull type brake is such that arms in a pair are respectively attached to support shafts on a pair of arm mounting plates fixed to the cycle body, to the front fork in particular, so as to be freely rotatable around said support shafts, and that return springs are installed between the arms and the mounting plates so that the brake shoes on the arms are energized in opposite directions respectively and are separated from the wheel rim, and the space between them is maintained. When the lifting wire attached to the aforementioned pair of arms is pulled up, both arms are rotated inwardly counteracting to the elasticity of the return springs and the brake shoes are made to contact the wheel rim. (Ref. Publication of Unexamined Utility Model Applications SHO 63 (1988)-193127).

Also, the aforementioned return springs are engaged onto bossed sections of arms at one end and onto mounting plates at the other end, via sleeves comprising spring covers, adjustment metals, coil springs, pawls, and ratchets and via support shafts, so as that the return spring tension can be adjusted with rotation of the adjustment metals.

However, the above mentioned conventional brake had the problem that, since the adjustment metal would rotate only in one direction during energy adjustment, it would be convenient for strengthening the tension, however, in weakening the tension the sleeve had to be unfastened once and re-tightened and the adjustment metal had again to be rotated for adjustment, making the processes quite complicated.

OBJECTS AND SUMMARY OF THE INVENTION

The present invention aims at providing a cycle brake of a simple structure, in which the energy adjustment of return springs can be easily performed by rotating adjustment metals in either direction, to the right or to the left.

In order to achieve the above objective, the following technical means is taken in the present invention. That is, in a cycle brake wherein paired arms furnished with brake shoes are mounted onto a cycle body via mounting plates so as to be freely rotatable and said arms are constantly energized in fanned directions so as that said brake-shoes are kept separated from each other by means of return springs installed between shafts of mounting plates and bossed sections of the arms, an adjustment disk is provided at least on one arm and is fitted onto a flanged sleeve connected to a shaft so as to be freely rotatable. At the same time the adjustment disk is provided with protrusions on the surface which face the flange of the flange sleeve. A stop ring is set onto its flanged sleeve between the adjustment disk and the flange, being fitted so as to be movable only in the axial direction; said stop ring 52 is provided with ratchets 52 which can be engaged onto protrusions on the adjustment disk, and is constantly pressed against the adjustment disk by means of a spring element.

In the present invention, when the brake lever is operated, right and left arms rotate around shafts, pressing right and left brake shoes against both sides of a wheel rim thus creating braking force. At this time, return springs are twisted by arms in a tightening direction. However, since both ends of the return spring remain engaged and do not slip, no frictional resistance will be created, and thus the brake can be operated lightly and smoothly without creating any creaking sound.

In the present invention, energy adjustment of the return spring is performed by rotating the adjustment disk in a clockwise or counter-clockwise direction with a rotating tool such as a wrench. At this time, the adjustment disk being rotated will temporarily release the engagement of the protrusions on the adjustment disk with ratchets on the stop ring, when said protrusions apply pressure onto said ratchets counteracting to the spring force of the spring element in the axial direction. When rotation of the adjustment disk is the aforementioned protrusions and ratchets are engaged again and the adjustment disk is fixed onto the mounting plate in that position via the stop ring and the sleeve. Thus, by rotation of the adjustment disk, the return spring is twisted in the circumferential direction (tightening direction) to adjust the energizing power.

As described above, in the present invention an adjustment of the tension of the return spring can be performed easily and accurately, merely by rotation of the adjustment disk from outside. Further, the engagement of the protrusions on the adjustment disk with the ratchets on the stop ring is accurately made, being pressed by the forceful spring element, and is completely free from any fears of weakened tension of the return spring by natural loosening.

BRIEF DESCRIPTION OF THE DRAWINGS

The drawing illustrates an embodiment of the present invention,

FIG. 1 being sections of important parts,
FIG. 2 an exploded perspective drawing, and
FIG. 3 the front view.

DESCRIPTION OF THE PREFERRED EMBODIMENT

Figure 2:
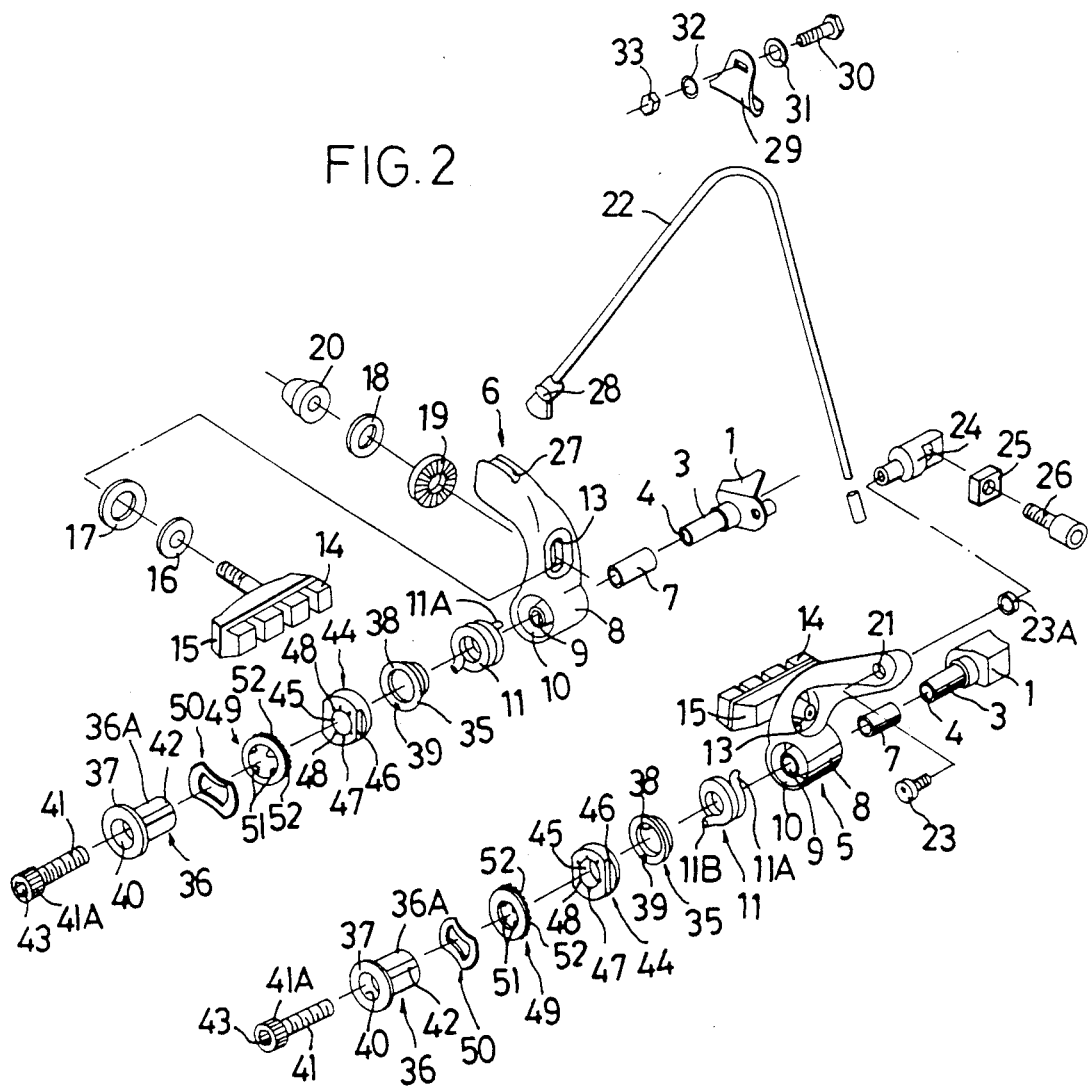

An embodiment of the present invention is described below based on the drawing.

The drawing illustrates an embodiment where the present invention was applied to a cantilever type caliper brake. FIG. 1 is a sectional drawing of the right arm mounting structure. Since the left arm is of the same structure except for the reverse winding direction of the return spring, the same part numbers are assigned in the description for both sides, except for arms themselves.

In the drawing, 1 is a mounting plate which is fixed to a cycle body, such as a front fork 2, with bolts or by other means. At the front part of the mounting plate 1 a shaft 3, said shaft 3 projects being hollow and provided with a female screw thread 4 at the inside.

5, 6 denotes a pair of arms which are mounted on shafts 3 at the lower end of mounting plates 1, via bushes 7, so as to be freely rotatable. Each arm, 5, 6 is L-shaped in its front view, one end or the lower end of which is identified as a bossed section 8, which is mounted onto the aforementioned shaft 3 via the bush 7; and at said bossed section 8 is provided a storage recess 10 for a return spring. Recess 10 is open at its front end and is coaxially aligned with a shaft hole 9, and in said storage recess 10 is stored a return spring 11 that is fitted onto the shaft 3. One end 11A of said return spring 11 is inserted and engaged in a spring edge inserting hole 12 provided on the rear wall of the aforementioned recess 10. The return spring 11 on the right arm is wound in a direction opposite to that on the left arm, the left spring being wound counter-clockwise and the right one clockwise.

Also, at the middle part or the elbow of the arm 5, 6 a brake shoe mounting hole 13 is provided, into which is mounted a brake shoe 14 by means of a holder 15, angle adjusting washers 16, 17, 18, a knurled washer 19 and a nut 20, so as to be freely adjustable angularly. At the upper end of the arm 5 is provided a hole 21 through which one edge of a lifting wire 22 is secured by means of a bolt 23, a washer 23A, a quick release screw 24, a wire fastening washer 25, and a bolt 26. Further at the upper end of the arm 6 is provided a wire clamping recess 27 into which a clamping metal 28, fixed on the other edge of the lifting wire 22, is fitted and clamped.

29 is a wire lifting metal, onto the lower part of which is hooked the central part of the lifting wire 22, and at the upper part of which is fixed an inner wire 34 of the Bowden cable by means of an inner fixing bolt 30, washers 31, 32 and a cap nut 33.

35 is a spring cap; 36 is a sleeve with a flange 37; said spring cap 35 at its central part is provided with a penetrating hole 38 through which the cylindrical portion 36A of the aforementioned sleeve 36 passes. The periphery of the opening at the rear end of said cap 35 is reduced in size, so as to be fitted into the aforementioned storage recess 10 for the return srping, and a spring edge inserting hole 39 is also provided on said cap 35 penetrating the front wall to allow insertion of the other edge 11B of the return spring 11.

The aforementioned sleeve 36 is provided with a hole 40 at the aforementioned flange 37, to permit storage of a head 41A of an arm-clamping bolt 41, while at the periphery of the cylindrical part 36A are provided a multiple number of grooves 42 along the entire length of the axial direction.

The arm-clamping bolt 41 has the cylindrical head 41A with knurls, at the end surface of which is provided a hexagonal socket 43 to engage a rotating tool, and said bolt 41 is inserted into the sleeve 36 and screwed into the female screw at the shaft 3 of the clamping plate 1, thus connecting the sleeve 36 onto the shaft 3 and unifying them.

44 is an adjustment disk to finely adjust the tension of the return spring 11 or the energizing force that acts on the arm 5, 6 and at the center of which is provided a sleeve inserting hole 45 that is fitted onto the cylindrical part 36A of the aforementioned sleeve 36, and at the periphery of which is cut a seat 46 to allow a rotating tool, such as a wrench, to be fitted on. And on said adjustment disk 44 is provided a spring edge inserting hole 47 at a position coinciding with the spring edge inserting hole 39 on the aforementioned cap 35, into which the return spring edge 11B is inserted and engaged. Also, the front surface of the adjustment disk 44, i.e. the surface opposite the flange 37 of the sleeve 36, has multiple protrusions 48 arranged radially, the cross section of said protrusions 48 being angular.

49 is a stop ring and 50 a spring element or a wavy spring washer, both of which are positioned between the flange 37 and the adjustment disk 44 and are fitted onto the cylindrical portion 36A of the aforementioned sleeve 36.

At the internal periphery of the stop ring 49 are provided stopping protrusions 51 which fit into grooves 42 on the periphery of the cylindrical part 36A of the sleeve so as to be axially slidable, therein while at the rear surface of said stop ring 49 are provided ratchets 52 with an angular cross section, which engage onto protrusions 48 on the adjustment disk 44, said ratchets 52 being engaged onto protrusions 48 in whatever angle the adjustment disk 44 may be rotated and being constantly applied pressure by means of spring force of the wavy spring washer 50.

In the above embodiment, when a brake lever (not illustrated) is operated, right and left arms 5, 6 will rotate around the shaft 3 and right and left brake shoes 14 will be pressed against both sides of the wheel rim 53, thus creating braking force. At this time, since the front edge 11B of the return spring 11 is fixed to the shaft 3 of the mounting plate 1 via the adjustment disk 44, clamping protrusions 48, ratchets 52, protrusions 51, grooves 42, sleeve 36, and the attaching bolt 41, the rear edge 11A of the return spring is rotated in the tightening direction by the arm 5, 6. Then, when the braking power is released, the spring force of return springs 11 rotates the arms 5, 6 in opposite outward directions from each other, widely separating the upper edges from each other, thus having the brake shoes 14 return to the initial position.

In order to adjust the tension of the return spring 11 or the energizing force for arms 5, 6, the adjustment disk 44 is turned clockwise or counter-clockwise with a rotating tool, such as a wrench, to tighten or unwind the return spring 11. At this time, the clamping protrusions 48 of the adjustment metal 44 will press and move the ratchets 52 in the axial direction in resistance to the spring force of the wavy spring washer 50, and will slide over the surface of ratchets 52. When the clamping protrusions 48 overcome each of ratchets 52, it will make a clicking sound, and the number of clicks will indicate the amount of adjustment of the return spring 11, which facilitates easy, accurate and balance adjustment of the arms 5, 6 by the operator.

According to the above embodiment, an adjustment can be made without removing the arms 5, 6 from the shafts 3, and further, since a multiple number of clamping protrusions 48 will accurately engage onto the ratchets 52 and be forcefully pressed against each other by the wavy spring washer 50, there is no fear of weakened tension of the return spring 11 due to natural loosening of the engagement, and it facilitates an easy assembly.

In the above embodiment, the shaft 3 may be made separate from the mounting plate 1 and be screwed together, and the cap 35 may be unified with the adjustment disk 44, so as to reduce the number of parts. Also the clamping protrusions 48 may be provided on the side of the stop ring 49 and the ratchets 52 on the side of the adjustment disk 44.

Further, the inside of the storage recess for the return spring on arms 5, 6 and the inside of the spring cap 35 may be filled with grease oil to prevent rusting.

While the above embodiment illustrates the case where the adjustment disk 44 is provided on both the right and left arms in order to adjust the energizing power, said adjustment disk may be provided only on one arm.

The above embodiment describes a cantilever type brake. However, the present invention can also be applied to the center pull type caliper brake and other types of brakes.

What is claimed is:

1. In a cycle brake wherein a pair of arms provided with brake shoes is mounted onto a cycle body via a mounting plate so as to be freely rotatable and said arms are constantly energized in fanning direction so that said brake shoes are seperated apart from each other by means of a return spring which is installed between a shaft of the mounting plate and a bossed section of the arm; wherein an adjustment disk is rotatably mounted, at least on one arm, in engagement with an end of the return spring for rotatably adjusting the retrun spring, said adjustment disk being fitted onto a flanged sleeve which is connected to the shaft; wherein a stop ring is fitted onto the flanged sleeve and is positioned between said adjustment disk and the flange of the flanged sleeve in a manner so as to be movable only in an axial direction; wherein one of said stop ring and said adjustment disk has ratchets that engage onto clamping protrusions provided on the other of said stop ring and the adjustment disk; and wherein a spring washer is disposed between the flange of the flanged sleeve and the stop ring and applies a force that constantly presses the stop ring against the adjustment disk, whereby rotation of the adjustment disk produces axial displacement of the stop ring against and by the force of the spring washer as the clamping protrusions move over the ratchets.

2. A cycle brake described in claim 1, wherein clamping protrusions are provided on the stop ring and the ratchets are provided on the adjustment disk.

3. A cycle brake described in claim 1, wherein a spring cap is unified with the adjustment disk.

* * * * *